Figure 1:
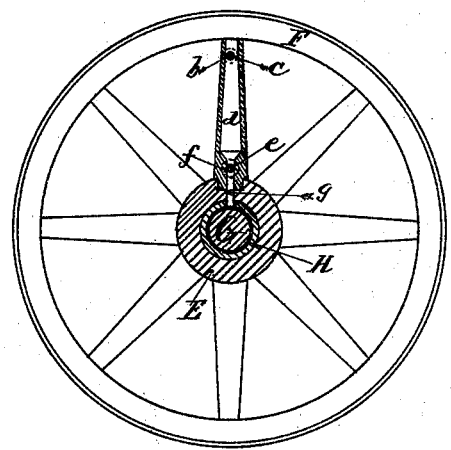
Figure 1:
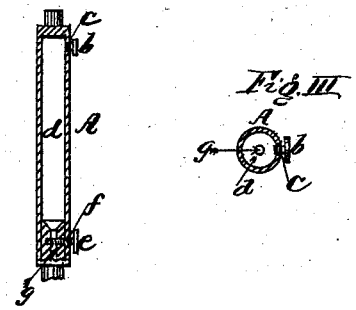
Figure 1:
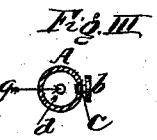

F. A. BRUNS.
AXLE LUBRICATOR.

No. 182,555. Patented Sept. 26, 1876.

Fig. II.

Fig. III.

Witnesses:
Franklin Barrett
Richard Gerner

Inventor:
Fredrick A. Bruns.
Per
Henry Gerner,
his atty.

UNITED STATES PATENT OFFICE.

FRIEDRICH A. BRUNS, OF NEW YORK, N. Y.

IMPROVEMENT IN AXLE-LUBRICATORS.

Specification forming part of Letters Patent No. 182,555, dated September 26, 1876; application filed July 8, 1876.

*To all whom it may concern:*

Be it known that I, FRIEDRICH A. BRUNS, of New York city, county and State of New York, have invented certain Improvements in Carriage-Wheels, of which the following is a specification:

The object of my invention is to provide for a reservoir for oil in a carriage-wheel, which shall lubricate the hub-box and the axle automatically as required, admitting more oil when the carriage is driven faster and less when slower, and ceasing altogether when the wheel is at rest.

My invention consists in inserting in the wheel a hollow spoke, the walls of which are pierced by a hole bored through the same, near the felly, and through which the oil is admitted into the interior reservoir. This hole is provided with screw-threads, into which fits a screwed tap, inserted in the said hole and closing this tight after the oil is admitted. The spoke is also pierced by having another hole bored through the same, near to the hub, and this hole is also provided with screw-threads into which fits a threaded set-screw, which admits more or less oil to the hub, as may be deemed necessary.

It will be readily understood that the more revolutions the wheel makes, and the more oil is required for lubricating and keeping cool the axle and the axle-box, the more oil will by this arrangement be admitted, and vice versa, the fewer revolutions the wheel makes and the less oil is required, the less will be admitted to the axle-box and the axle, while, when the wheel is not revolved, the driver has only to see that the hollow spoke is turned down in order not to waste any oil at all. I do not, however, confine myself to one hollow spoke; more may be used according to circumstances.

In order to describe my invention more fully, I refer to the accompanying drawings forming a part of this specification.

Figure I is a vertical sectional view of a hollow spoke attached to the hub and felly of a wheel. Fig. II is a detached vertical sectional view of the spoke, taken on line $x\ x$, Fig. I. Fig. III is a plan sectional view of the spoke.

A is a hollow spoke, with screw $b$ inserted in the hole $c$, through which the oil is admitted into the interior or the reservoir $d$. $e$ is a set-screw inserted in the hole $f$, which leads into the contracted channel $g$, through which the oil is admitted into the axle-box and the axle. E is the hub. F is one of the fellies of the wheel. G is the axle, and H the axle-box.

Having thus described my invention, I desire to claim—

The hollow spoke A, with holes $c$ and $f$, and screws $b$ and $e$, substantially as described, and for the purpose set forth.

This specification signed this 12th day of June, 1876.

FR. AD. BRUNS.

Witnesses:
FRANKLIN BARRITT,
RICHARD GERNER.